United States Patent [19]

Foster et al.

[11] Patent Number: 5,071,311
[45] Date of Patent: Dec. 10, 1991

[54] LOADER BUCKET MOUNTED HAY BALE SPEAR

[76] Inventors: Anderson L. Foster, 1591 Columbia 13; John P. Edington, P.O. Box 136, both of McNeil, Ark. 71752

[21] Appl. No.: 669,457

[22] Filed: Mar. 13, 1991

[51] Int. Cl.$^5$ ............................................. B66F 9/00
[52] U.S. Cl. ............................ 414/724; 414/24.5; 414/911
[58] Field of Search .................. 414/685, 724, 24.5, 414/912, 910, 911; 37/117.5, DIG. 3, 12

[56] References Cited

U.S. PATENT DOCUMENTS

| | | |
|---|---|---|
| 3,421,642 | 1/1969 | Carter .................................. 414/724 |
| 3,921,837 | 11/1975 | Vandewater . |
| 3,934,726 | 1/1976 | Martin . |
| 4,015,739 | 4/1977 | Cox . |
| 4,027,773 | 6/1977 | Kenworthy . |
| 4,050,534 | 8/1977 | Kenworthy . |
| 4,120,405 | 10/1978 | Jones et al. . |
| 4,179,034 | 12/1979 | Van Antwerp et al. . |
| 4,247,243 | 1/1981 | Carter .................................. 414/724 |
| 4,329,103 | 5/1982 | Miller . |
| 4,669,947 | 6/1987 | Frost .................................. 414/724 |
| 4,674,786 | 6/1987 | Lynch . |
| 4,854,809 | 8/1989 | Rhodes .................................. 414/685 |
| 4,911,596 | 3/1990 | Fetter . |

Primary Examiner—Robert J. Spar
Assistant Examiner—Donald W. Underwood
Attorney, Agent, or Firm—Fleit, Jacobson, Cohn, Price, Holman & Stern

[57] ABSTRACT

An elevatable and tiltable loader bucket is provided with a large hay bale spear attachment with the attachment and the loader bucket including coacting structure removably supporting the attachment from the bucket in a manner such that the operator of a prime mover from the bucket is supported may advance toward, pick up and support the attachment from the bucket against accidental dislodgement therefrom and thereafter reposition the attachment back upon the ground and disengage the bucket therefrom, all without the operator of the prime mover dismounting from the operators position thereof.

8 Claims, 1 Drawing Sheet

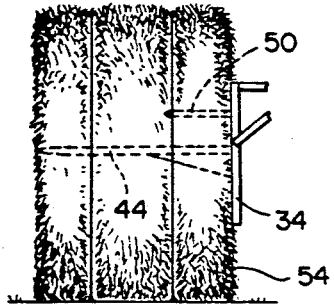
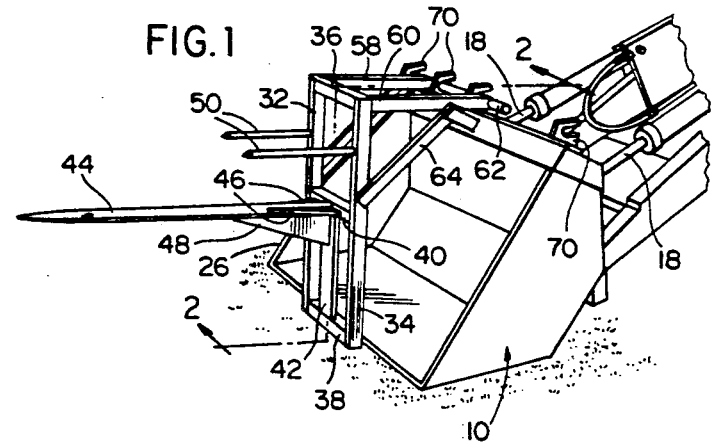
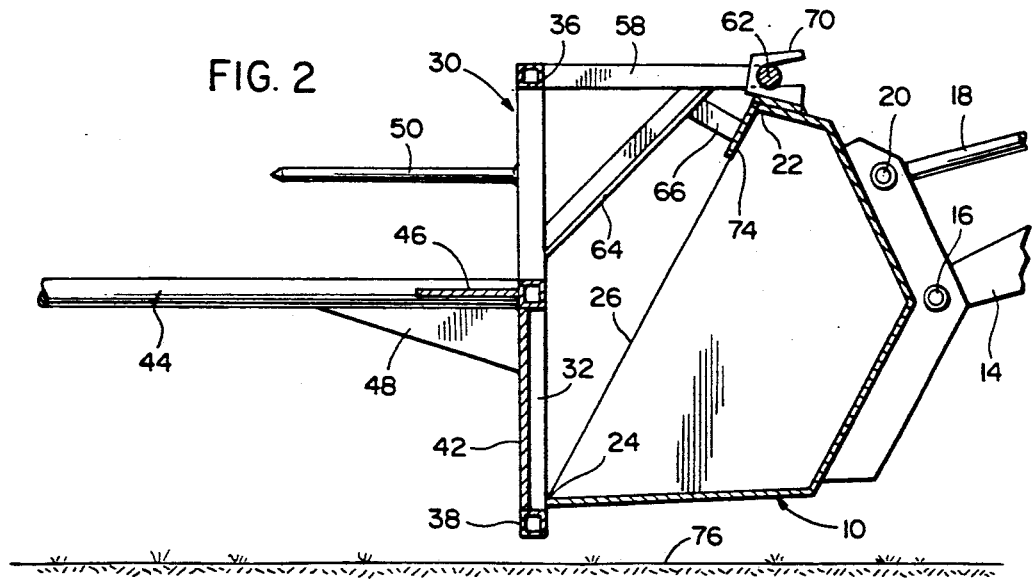
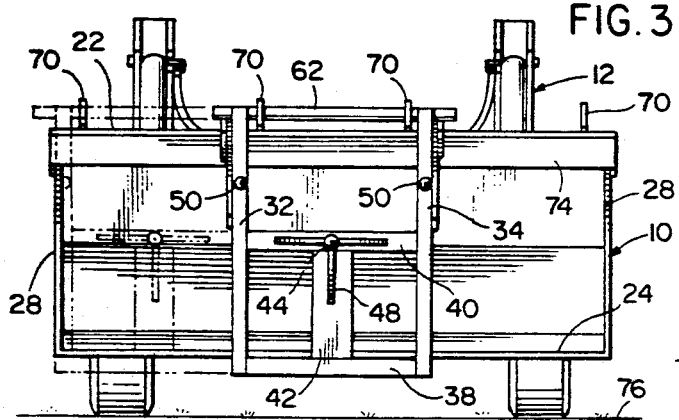
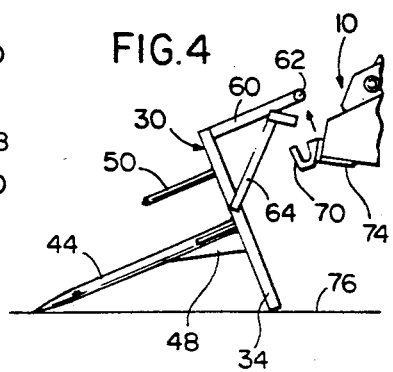

5,071,311

LOADER BUCKET MOUNTED HAY BALE SPEAR

BACKGROUND OF THE INVENTION

1. Field of the Invention

The present relates to an attachment for a front loader bucket, and, more particularly, to a hay bale spear assembly which may utilized to spear and pick up large bales of hay with the loader bucket, the attachment and bucket including coacting structure for removably supporting the attachment from the bucket against accidental dislodgement therefrom during usage of the attachment and with the coacting structure enabling the attachment to be removably supported and disengaged from the bucket merely by manipulation of the front end loader bucket.

2. Description of Related Art

Various different forms of hay bale handling attachments for both the rear ends of tractors and tractors equipped with front loader buckets heretofore have been provided. Examples of these previously known structures are disclosed in U.S. Pat. Nos. 3,921,837, 3,934,726, 4,015,739, 4,027,773, 4,040,534, 4,120,405, 4,179,034 4,329,103, 4,674,786 and 4,911,596. However, these previously known forms of attachments do not enjoy the coacting attachment and bucket structure of the instant invention whereby a hay bale spear attachment for a loader bucket may be readily removably supported from a loader bucket against accidental dislodgement therefrom and operatively picked up from the ground by the bucket and replaced back upon the ground in disconnected association with the bucket merely by proper manipulation of the bucket by the operator thereof without the operator dismounting from the associated loader bucket equipped vehicle.

SUMMARY OF THE INVENTION

The attachment of the instant invention comprises an upstanding frame having front and rear sides, spear means projecting forwardly from the frame for spearing a hay bale and support arms projecting rearwardly of the upper margin of the frame interconnected at their rear ends by transverse lift member extending therebetween.

A loader bucket to be used in conjunction with the attachment includes at least one pair of rearwardly opening hooks spaced along its upper margin and the hooks, upon proper manipulation of the bucket, may be engaged with the transverse lift member on the bucket in order to lift the attachment from the ground and removably anchor the attachment to the bucket in position against accidental dislodgement therefrom during hay bale spearing, lifting and transporting operations.

The main object of this invention is to provide an attachment for a loader bucket which may be conveniently used to spear, lift and transport large hay bales from the loader bucket.

Another object of this invention is to provide an attachment in accordance with the preceding objects and enjoying support from the associated loader bucket through the utilization of support hooks mounted from the upper margin of the bucket structured in a manner such that the attachment may be engaged by the hooks, lifted from the ground and operatively supported from the loader bucket, all upon proper manipulation of the loader bucket by the operator of the associated prime mover.

Still another important object of this invention is to provide a hay bale attachment which is specifically adapted to enable the attachment to load large round bales of hay into the load bed of a pick up truck without damage to the load bed.

A further object of this invention is to provide a hay bale spearing and supporting attachment for support from a loader bucket in predetermined selected positions spaced transversely of the loader bucket.

A final object of this invention to be specifically enumerated herein is to provide an attachment in accordance with the preceding objects and which will conform to conventional forms of manufacture, be of simple construction and easy to use so as to provide a device that will be economically feasible, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of a typical form of loader bucket with the attachment of the instant invention removably supported therefrom;

FIG. 1A is a fragmentary reduced scale side elevational view of the attachment in operative association with a large round bale of hay;

FIG. 2 is an enlarged fragmentary vertical sectional view taken substantially upon the plane indicated by the section line 2—2 of FIG. 1;

FIG. 3 is a front elevational view of the assemblage illustrated in FIG. 1; and

FIG. 4 is a side elevational view of the attachment supported from a horizontal surface in a forwardly and downwardly inclined position and with the coacting support hooks carried by the upper marginal edge of the loader bucket in position to be upwardly swung into engagement with a transverse support member of the attachment for lifting the latter from the ground.

DESCRIPTION OF THE PREFERRED EMBODIMENT

Referring now more specifically the drawings the numeral 10 generally designates a loader bucket mounted from the forward end of a tractor referred to in general by the reference numeral 12. The tractor 12 includes forwardly projecting hydraulically operated lift arms 14 from which the rear of the bucket 10 is pivotally supported as at 16 and the extendible and retractable outer ends of a pair of hydraulic cylinder piston shanks 18 are pivotally anchored to the bucket as at 20. The piston shanks 18 are illustrated in intermediate positions in FIGS. 1 and 2 and may be retracted in order to pivot the bucket 10 to an upwardly opening position, or extended to pivot the bucket 10 toward a forwardly and downwardly opening position such as that illustrated in FIG. 4, the foregoing all being considered as conventional structure.

The bucket 10 is illustrated in its intermediate, horizontally forwardly opening position in FIG. 2 and may be seen to include first and second horizontal transverse margins 22 and 24 disposed uppermost and lowermost, respectively, when the bucket 10 is in the forwardly opening intermediate position of oscillation thereof relative to the lift arms 14.

The distance between the upper and lower margins 22 and 24 is slightly less than 32 inches and the bucket includes opposite side margins 26 and 28 which may be spaced apart approximately six feet.

The hay spear, lifting and transporting attachment of the instant invention is referred to in general by the reference numeral 30 and includes a rectangular upright frame of a width generally one-third the transverse width of the bucket 10 and having horizontally spaced, vertical opposite side members 32 and 34 interconnected at their upper and lower ends by upper and lower transverse members 36 and 38. In addition, the frame includes an approximate mid-height transverse member 40 extending between the members 32 and 34 and a central upright member 42 extending between and secured to the members 40 and 38.

An elongated main spear 44 is supported from the longitudinal center of the transverse member 40 and braced relative to the opposite ends thereof by triangular bracing plates 46. In addition, the underside of the base end of the spear 44 is braced relative to the member 42 through the utilization of a triangular bracing member 48. Also, the mid-height portions of the members 32 and 34 disposed above the member 40 include short forwardly projecting spear elements 50 which serve to penetrate an associated round hay bale and to steady the round hay bale on the spear 40, see FIG. 1A.

As may be seen in FIG. 1A, the spear 44, which is substantially four feet in length, extends substantially entirely through a typical round hay bale 54 which may be four feet in axial extent and six feet in diameter. The spear elements 50 serve to steady the hay bale 54 on the spear 44, as do the triangular plates 46 and 48.

The upper ends of the opposite side members 32 and 34 include rearwardly projecting arms 58 and 60 between whose rear ends a horizontal transverse connecting and lifting member 62 extends and is secured, the opposite ends of the member 62 projecting outwardly from opposite sides of the arms 58 and 60. In addition, inclined braces 64 are secured between the opposite side members 32 and 34 and the arms of 58 and 60, respectively, and the upper ends of the braces 64 include short rearwardly projecting and slightly downwardly inclined abutment members 66 for a purpose to be hereinafter more fully set forth.

The uppermost margin 22 of the bucket 10 includes four rearwardly opening hooks 70 supported therefrom. A center pair of hooks 70 is illustrated in FIGS. 1 and 3 as engaged with the transverse connecting member 62 immediately inward of the rear ends of the arms 58 and 60 and each center hook 70 includes a companion end hook 70 adjacent the corresponding transverse end of the bucket 10. The spacing between each of the companion hooks 70 and the corresponding center hook 70 is greater than the spacing between the center hooks 70 such that each companion hook and the corresponding center hook 70 may be engaged with the opposite ends of the transverse connecting member 62 on the outer sides of the rear ends of the arms 58 and 60. Nevertheless, the outermost companion hooks 70 are spaced inward from the transverse ends or margins 26 and 28 of the bucket 10.

As may be seen from FIG. 2 of the drawings, when the transverse connecting member 62 is engaged by and supported from a pair of the hooks 70, the lower margin of the frame comprising the members 32, 34, 36 and 38 abuttingly engages the lowermost margin of the forwardly opening bucket 10. Furthermore, the abutment members 66 abuttingly engage the upper horizontal transverse plate 74 at the uppermost margin 22 of the bucket 10. In this manner, when the bucket 10 is in a horizontally opening position such as that illustrated in FIG. 2 the attachment 30 may not be dislodged from support from the bucket 10. However, when the support arms 14 are slightly raised and the piston shafts 18 are extended in order to position the bucket 10 in a downwardly opening position such as that illustrated in FIG. 4, the forwardly and downwardly inclined margins 26 and 28 are swung passed vertical positions and into rearwardly and downwardly inclined positions such that the lowermost margin 24 of the bucket 10 will swing rearwardly away from the lower margin of the frame of the attachment 30 thereby swinging the transverse plate 74 away from the abutment members 66. Then, when the arms 14 are lowered, the hooks 70 are disposed in upwardly opening positions and may drop freely from the transverse connecting or lifting member 62 when the lower end of the frame of the attachment contacts the ground 76 to thus disengage the bucket 10 from the attachment 30, after which the attachment 30 will then fall forwardly, because of its off center weighing due to the spear 44, into the forwardly and downwardly inclined ground supported rest position thereof illustrated in FIG. 4. Of course, if it is desired to again attach the attachment 30 to the bucket 10, the bucket is positioned beneath the hooks 70 in the manner illustrated in FIG. 4 of the drawings with the bucket 10 in a forwardly and downwardly opening position and the arms 14 are thereafter raised in order to swing the hooks 70 up into engagement with the transverse connecting member 62. Continued lifting of the attachment 30, combined with angular displacement of the bucket 10 back to the horizontally opening position thereof illustrated in FIG. 2, automatically will rigidly support the attachment 30 from the bucket 10 against accidental dislodgement therefrom, all of which action may be accomplished by the operator of the tractor or prime mover 12 without the operator leaving the operators position thereof.

If large round bales 54 are to be picked up, moved from one location to another and then redeposited back upon the ground in an unconfined area, the attachment 30 may be supported from the center pair of hooks 70. However, if the large round bales are to be loaded into a shed having a sloped roof for storage, the attachment 30 is supported from the pairs of hooks 70 adjacent the side wall of the shed into which the tractor 10 is to be driven. This will enable the operator and the operators cab (not shown) of the tractor 12 to enter the shed adjacent the longitudinal center line thereof in order to prevent the operators cab (not shown) from striking a lower portion of the inclined roof of the shed.

With attention invited more specifically to FIG. 1A, it may be seen that the attachment 30 has its lower extremity positioned considerably above the lower periphery of a six foot diameter round bale. Accordingly, a six foot round bale may be loaded into a pick up truck over the side wall of the bed thereof without any portion of the attachment 10 contacting the side wall bed of the pick up truck. The height of the frame of the attachment 30 is approximately 32 inches and, accordingly, when the lower periphery of a six foot bale is resting upon the floor of a pick up truck load bed, the lower end of the frame of the attachment 30 is elevated at least 20 inches above the lower margin of the bale 54. Of course, the center spear 44 may be engaged with the round bale 54 at a location spaced somewhat above the center axis of the bale 54 to provide even greater clearance between a horizontal surface upon which the bale 54 rests and the lower transverse member 38 of the attachment 30.

Another advantage of being able to disconnect the attachment 30 from the bucket 10 without the operator of the tractor 12 dismounting therefrom is that once the hay bale 54 has been engaged by the attachment 30 as illustrated in FIG. 1A and the bale is being transported over slushy or muddy ground or loose hay and mud piles up under the front wheels of the tractor because of the considerable additional loading thereon by the hay bale 54, the bucket 10 may be readily lowered and rotated forwardly and downwardly to release the hooks 70 from the transverse connecting member 62 and the bucket 10 then may be used to smooth over the ground. Then, the bucket 10 may be reengaged with the transverse connecting member 62 and the tractor 12 may again proceed to its destination, all without the operator of the tractor 10 dismounting therefrom.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a prime mover having opposite front and rear ends and adapted to be advanced in opposite directions in which said front and rear ends face, said prime mover including a load bucket supported therefrom, disposed outwardly of one of said ends and mounted from said prime mover for vertical adjustment relative thereto and also oscillatory movement about a horizontal transverse axis between a first upwardly opening position, a second position opening downwardly and an intermediate position opening horizontally outwardly of said one end, said bucket including first and second horizontal transverse margins disposed uppermost and lowermost, respectively, when said bucket is in said intermediate position with said second transverse margin spaced further outward of said one end than said first transverse margin, a hay bale handling attachment, said attachment including an upright frame defining front and rear sides and including upper and lower margins as well as opposite side margins extending between and interconnecting corresponding ends of said upper and lower margins, said frame including first elongated spear means projecting forwardly from said front side generally centrally intermediate said upper and lower margins and centrally intermediate said opposite side margins and at least one additional spear means projecting forwardly from said frame generally paralleling and spaced laterally of said long spear means, said upper margin including a pair of generally horizontal arms projecting rearwardly of said frame, a transverse connecting member extending between and interconnecting the rear ends of said arms, inclined brace means extending between and interconnecting the rear end portions of said arms and the corresponding opposite side margins of said frame, said first margin including at least one pair of hook members supported therefrom opening generally horizontally toward said one end when said bucket is lowered and in said intermediate position of oscillation, said hook members, when said frame is resting upon a horizontal surface in a forwardly and downwardly inclined position with the forward end of said long spear means also resting upon said horizontal surface, being displaceable into position beneath the opposite end portions of said transverse connecting member when said bucket is in said second position and thereafter upwardly engagable with said transverse connecting member upon elevation of said bucket, said frame, when said transverse connecting member is supported from said hook members and said bucket is swung to said intermediate position, projecting downwardly to a position extending at least slightly downward past said second transverse margin.

2. The prime mover, bucket and attachment combination of claim 1 wherein said hook members open generally horizontally rearwardly when said bucket is said intermediate position, said frame including abutment means abuttingly engaging a forward facing portion of said first transverse margin below said hook members when said bucket is in said intermediate position to prevent rearward disengagement displacement of said transverse connecting member from said hook members.

3. The prime mover, bucket and attachment combination of claim 1 wherein said pair of hook members are centrally disposed on said first transverse margin and each of said hook members includes a companion hook member supported on said transverse margin spaced therealong in a direction extending away from the other member of said pair of hook members, each of said pair of hook members and the companion hook member also comprising a pair of hook members from which said transverse connecting member may be supported.

4. The combination of claim 3 wherein the first mentioned pair of hook members are spaced apart a distance slightly less than the spacing between the rear ends of said arms and each hook member of the first mentioned pair of hook members and the companion hook member are spaced apart a distance slightly greater than the distance between the rear ends of said arms.

5. The combination of claim 4 said hook members open generally horizontally rearwardly when said bucket is said intermediate position, said frame including abutment means abuttingly engaging a forward facing portion of said first transverse margin below said hook members when said bucket is in said intermediate position to prevent rearward disengagement displacement of said transverse connecting member from said hook members.

6. In combination with a prime mover having opposite front and rear ends and adapted to be advanced in opposite directions in which said front and rear ends face, said prime mover including a load bucket supported therefrom, disposed outwardly of one of said ends and mounted from said prime mover for vertical adjustment relative thereto and also oscillatory movement about a horizontal transverse axis between a first upwardly opening position, a second position opening horizontally downwardly and an intermediate position opening horizontally outwardly of said one end, said bucket including first and second horizontal transverse margins disposed uppermost and lowermost, respectively, when said bucket is in said intermediate position, a hay bale handling attachment, said attachment including an upright frame of a width generally one-third the transverse width of said bucket and defining front and rear sides and including upper and lower margins, said upper margin supporting a transverse lifting member therefrom, said front side supporting a spear means, said first margin including four hook members supported therefrom and spaced therealong opening generally horizontally toward said one end when said bucket is lowered and in said intermediate position of oscillation, each pair of adjacent hook members, when said frame is resting upon a horizontal surface in a forwardly and downwardly inclined position with the forward end of said spear means also resting upon said horizontal surface, being selectively displaceable into position beneath the opposite end portions of said transverse lifting member when said bucket is in said second position and thereafter upwardly engagable with said transverse lifting member upon elevation of said bucket, said transverse lifting member being of a length to span between any adjacent pair of said hook members, but insufficient to span between three adjacent hook members, said frame, when said transverse lifting member is supported from said hooks and said bucket is swung to said intermediate position, projecting downwardly to a position extending at least slightly downward past said second transverse margin, said attachment, when supported from the center pair of adjacent hook members, being generally centered relative to said first and second margins and, when supported from either end pair of adjacent hook members, being supported from the corresponding end of said first and second margins.

7. The combination of the claim 6 wherein the opposite ends of said upper margin include a pair of generally horizontal arms projecting rearwardly therefrom from whose rear ends said transverse lifting member is supported, the center pair of hook members being spaced apart a distance slightly less than the spacing between the rear ends of said arms and each hook member of the center pair of hook members and its other adjacent hook member being spaced apart a distance slightly greater than the distance between the rear ends of said arms.

8. The prime mover, bucket and attachment combination of claim 6 wherein said upper margin of said frame includes abutment means abuttingly engaging said first margin of said bucket below said hook members when said bucket is in said intermediate position to prevent rearward displacement of said transverse lifting member relative to said hook members when said bucket is in said intermediate position.

* * * * *